United States Patent [19]

Nycz et al.

[11] Patent Number: 5,788,592
[45] Date of Patent: Aug. 4, 1998

[54] DRIVE SYSTEM FOR AN AGRICULTURAL FORAGE BOX

[75] Inventors: Dennis Nycz, West Bend; Russell Kempf, Kewaskum; Ronald Grimstad, West Bend, all of Wis.

[73] Assignee: Gehl Company, West Bend, Wis.

[21] Appl. No.: 515,518

[22] Filed: Aug. 15, 1995

[51] Int. Cl.$^6$ ............................................. F16H 59/02
[52] U.S. Cl. ..................................... 474/38; 414/502
[58] Field of Search ............................. 474/37, 38, 101; 414/502

[56] References Cited

U.S. PATENT DOCUMENTS

| | | | |
|---|---|---|---|
| 3,595,289 | 7/1971 | Greiner | 241/83 |
| 3,804,279 | 4/1974 | Braunberger et al. | 414/502 |
| 4,049,145 | 9/1977 | Downing et al. | 414/502 |
| 4,078,640 | 3/1978 | Nickel et al. | 241/101.76 X |
| 4,149,426 | 4/1979 | Rosbak et al. | 474/101 X |
| 4,154,406 | 5/1979 | Nickel et al. | 241/37.5 |
| 4,171,180 | 10/1979 | Wagstaff et al. | 414/502 |
| 4,717,308 | 1/1988 | Kuhns | 414/307 |

OTHER PUBLICATIONS

Model BU—970 Forage Box, Service Parts Manual, 904394/1P489, Gehl Company, West Bend, WI, 1989.
Model BU—970 Forage Box, Operator's Manual, 904475/2P789, Gehl Company, West Bend, WI, 1989.

Primary Examiner—Roger J. Schoeppel
Attorney, Agent, or Firm—Andrus, Sceales, Starke & Sawall

[57] ABSTRACT

An agricultural forage box includes an infinitely positionable variable speed drive system and an improved trip mechanism. The variable position drive system utilizes a drive belt for driving the floor conveyor of the forage box, which is driven in response to rotation of a pair of sheave sections. One of the sheave sections can be moved relative to the other, and a sheave positioning mechanism provides adjustment in the position of the movable sheave section. The variable position mechanism includes a yoke which is movable in response to operation of an actuator plate and linkage mechanism, which in turn is interconnected with a control lever. The improved trip mechanism includes a trip bar mounted to the forage box for pivotal movement about its longitudinal axis. A trip lever is located adjacent a declutching tab associated with the power train. A pair of cables extend between the trip bar and the trip lever, and are connected one on either side of the trip bar longitudinal axis. With this construction, pivoting the trip bar in either pivoting direction tensions one or the other of the cables to move the trip lever into its operative position to stop operation of the unloading components of the forage box.

17 Claims, 4 Drawing Sheets

DRIVE SYSTEM FOR AN AGRICULTURAL FORAGE BOX

BACKGROUND AND SUMMARY OF THE INVENTION

This invention relates to an agricultural forage box, and more particularly to improvements in a forage box providing advantages in safety and in operation of the box-unloading components of a forage box.

Agricultural forage boxes are old and well-known, and typically include a chain-type floor conveyor which moves forage material toward the forward end of the box, a front cross-conveyor which discharges material to the side of the box, and a beater assembly which functions to break-up material and to move the material downward and forward toward the cross-conveyor as the material is advanced toward the front end of the box by the floor conveyor. It is known to provide a single-lever arrangement for controlling engagement of the beater assembly and the floor conveyor, as well as the speed of operation of the floor conveyor. Typically, the cross-conveyor and beater assembly are driven directly by a drive system interconnected with the PTO input, and the speed of operation of the floor conveyor can be varied in order to vary the amount of material delivered to the cross-conveyor. While single-lever control systems are known, no known systems provide infinite adjustability in the speed of operation of the floor conveyor.

In addition, prior art trip bars are known for enabling an operator to manually disengage the drive system which transfers power to the cross-conveyor, beater assembly and floor conveyor, whenever desired. In the past, trip bars have typically been operable when pivoted in one direction only.

It is an object of the present invention to provide a variable speed drive system for the box-unloading components of a forage box, in which the speed of operation of one or more of the components can be infinitely varied. It is a further object of the invention to provide such a system which is relatively simple in its construction, components and operation, yet which provides an operator with a high degree of flexibility in selecting the speed of operation of the box-unloading components. It is another object of the invention to provide a trip bar for selectively disengaging the power transmission to the box-unloading components of the forage box, which can be manually pivoted in either a first or a second pivot direction to disengage the transmission when desired.

In accordance with one aspect of the invention, a control system for an agricultural forage box having a box-unloading mechanism driven in response to a drive arrangement, includes a variable positioning mechanism forming a part of the drive arrangement for varying the speed of operation of the box-unloading mechanism. A control lever is interconnected with the variable positioning mechanism and is movably mounted to the forage box for movement from a neutral position to a range of operative positions between a first operative position and a second operative position. Movement of the control lever to its first operative position moves the variable positioning mechanism to a first operating position to operate the drive arrangement and the box-unloading mechanism at a first speed, and movement of the control lever to its second operative position moves the variable positioning mechanism to a second operating position to operate the drive arrangement and the box-unloading mechanism at a second speed. A control assembly is interposed between the control lever and the variable positioning mechanism. The control assembly provides infinite adjustment and positioning of the variable positioning mechanism between its first and second operative positions, to provide infinite control in the speed of operation of the box-unloading mechanism in response to movement of the control lever between its first and second operative positions. The variable positioning mechanism, control lever and control assembly are operable to control at least the speed of operation of the floor conveyor, with the speed of operation of the beater assembly and the cross-conveyor being controlled directly by the speed of operation of the PTO input shaft.

The drive mechanism includes a drive belt drivingly engaged with a pair of sheaves, and the variable positioning mechanism includes one of the sheaves being split into a pair of sheave sections defining spaced, angled drive surfaces. At least one of the sheave sections is movable so as to vary the spacing between the drive surfaces to vary the position of the belt on the sheave sections. The control assembly includes a first actuator member, in the form of an actuator plate, interconnected with the control lever and movable in response to movement of the control lever; a second actuator member; and a shift linkage interconnected between the first and second actuator members for moving the second actuator member in response to movement of the control lever and the first actuator member. A movable sheave positioning mechanism is interconnected between the second actuator member and one of the sheave sections for controlling the position of the sheave section. A selectively actuable locking mechanism is interconnected with one of the actuator members, preferably the second actuator member, for maintaining the control assembly in a selected position after movement thereto by the shift linkage through the control lever and the first actuator member. The second actuator member is pivotably mounted to the forage box, and the selectively actuable locking mechanism is interconnected between the second actuator member and the forage box for selectively preventing movement of the second actuator member. A manually operable lock release is associated with the control lever for manipulation by a user, for selectively enabling the user to move the control lever to a desired position to move the sheave positioning mechanism. The manually operable lock release is movably mounted to a handle secured to the control lever, and is operable in response to manual manipulation by the operator to selectively release a clamp assembly, which in turn is selectively engageable with a locking rod mounted to the second actuator member. Releasing the clamp assembly allows the locking rod to be extended and retracted upon movement of the second actuator member caused by movement of the control lever, and engagement of the clamp assembly prevents extension or retraction of the locking rod. This prevents movement of the second actuator member and the variable positioning mechanism, to thereby lock the movable sheave section in position. The sheave positioning mechanism includes a pivotable yoke member to which a movable one of the sheave sections is mounted, and a connector, including a flexible section, interposed between the second actuator member and the yoke to provide pivoting movement of the yoke in response to pivoting movement of the second actuator member. The yoke is pivotably mounted to the forage box, and the connector is secured to the yoke so as to provide pivoting movement of the yoke which in turn provides movement of the movable sheave section.

In accordance with another aspect of the invention, a spring is interposed between the sheave sections of the variable positioning mechanism for urging the sheave sections apart. The variable positioning mechanism thus functions against the biasing force of the spring to move the sheave sections together, and the sheave sections are movable to a first position in which facing portions of the sheave sections engage each other when the sheaves are moved fully together. The sheaves include spring-receiving structure for receiving the ends of the spring, and the spring-receiving structure is arranged and dimensioned so as to prevent the spring from attaining a fully compressed condition when the sheave sections are in their first position. The sheave sections each include a hub portion defining facing, inner surfaces which engage each other when the sheave sections are in their first position. The spring-receiving structure is in the form of annular recesses formed in the facing, inner surfaces of the sheave hub portions, with the ends of the spring being disposed within the recesses.

In accordance with yet another aspect of the invention, a trip mechanism for an agricultural forage box includes a pivotable trip lever, a manually engageable trip bar, and a trip lever actuator arrangement. The forage box includes a clutched drive arrangement for operating a box-unloading mechanism, and the trip lever -is pivotably movable between an operative position in which the trip lever engages the clutch to disengage the drive arrangement and stop operation of the box-unloading mechanism, and an inoperative position in which the trip lever is disengaged with the clutch. The trip bar extends along a longitudinal axis, and is mounted to the forage box so as to be pivotable about its longitudinal axis. The actuator arrangement extends between the trip bar and the trip lever, and the trip bar is pivotable from a neutral position in first and second pivot directions about its longitudinal axis so as to move the trip lever, through the trip lever actuator arrangement, to its operative position when the trip bar is moved away from its neutral position in either the first or second pivot directions. The trip bar is constructed so as to be manually engageable at a location offset from its longitudinal axis, to enable the operator to pivot the trip bar in either the first or second pivot directions. The trip lever actuator arrangement consists of a pair of cables connected to the trip lever and to the trip bar one on either side of the trip bar longitudinal axis. With this arrangement, movement of the trip bar in either the first or second pivot directions tensions one or the other of the pair of cables to provide pivoting movement of the trip lever from its inoperative position to its operative position. The trip lever defines a pair of angled legs and is pivotably mounted to the forage box about a pivot axis located adjacent the intersection of the legs. The cables are connected to one of the trip lever legs, and a spring is connected to the other of the trip lever legs for biasing the trip lever toward its inoperative position.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 6 is an exploded isometric view showing the variable position sheave sections for the forage box drive system of FIG. 5;

FIG. 7 is a partial sectional view showing the sheave sections of FIG. 6 in an assembled condition;

DETAILED DESCRIPTION OF THE INVENTION

Figure 1:
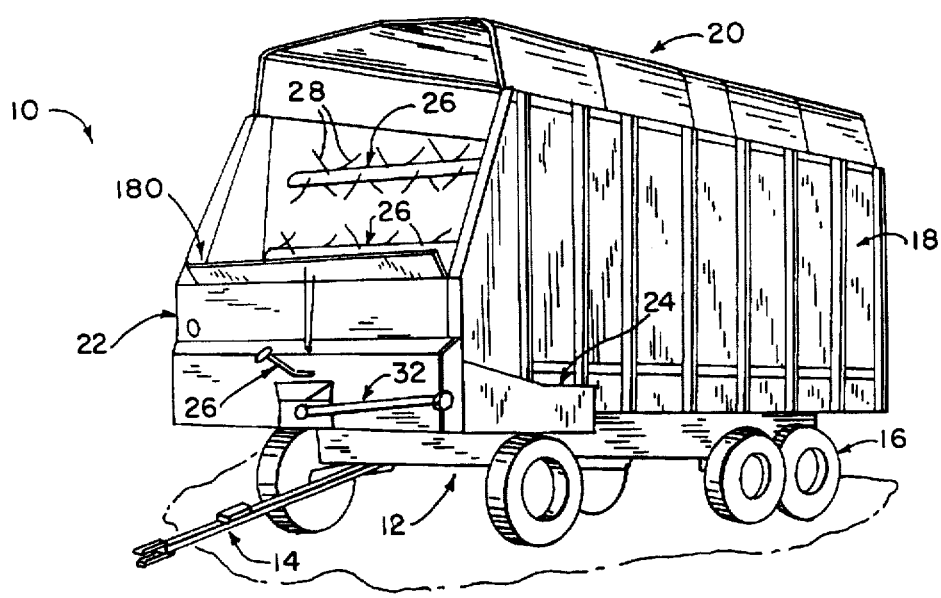
FIG. 1 is an isometric view of an agricultural forage box incorporating the drive system control arrangement and trip mechanism of the present invention.

Referring to FIG. 1, an agricultural forage box 10 generally includes a frame structure 12 having a draw bar 14, running gear including a series of ground-engaging wheels 16 mounted to the frame structure 12, and a floor mounted to the top of frame structure 12. A pair of side walls 18 extend upwardly from the sides of the floor, as does a rear wall (not shown), and a roof 20 extends between the tops of the side walls and the top of the rear wall. A partial-height front wall 22 encloses the lower, forward ends of the side walls 18, and defines an opening thereabove through which forage material is introduced into forage box 10. A chain-type floor conveyor is disposed over the floor of forage box 10 for moving material to the forward extent of the floor. An apron or cross conveyor is located below and forwardly of the floor for receiving the material and discharging it sidewardly through a discharge chute 24. A conventional beater assembly, consisting of a pair of beater bars 26 having a series of radial bars 28, extends between the forward ends of side walls 18, and is driven so as to force material downwardly and forwardly toward the cross conveyor as the material is conveyed toward the forward end of forage box 10 by the floor conveyor.

The above construction, components and operation of forage box 10 is conventional and known to those skilled in the art.

The present invention provides an improved variable speed drive system for the floor conveyor of forage box 10, and an improved trip mechanism for selectively preventing operation of the box-unloading components of forage box 10.

Figure 2:
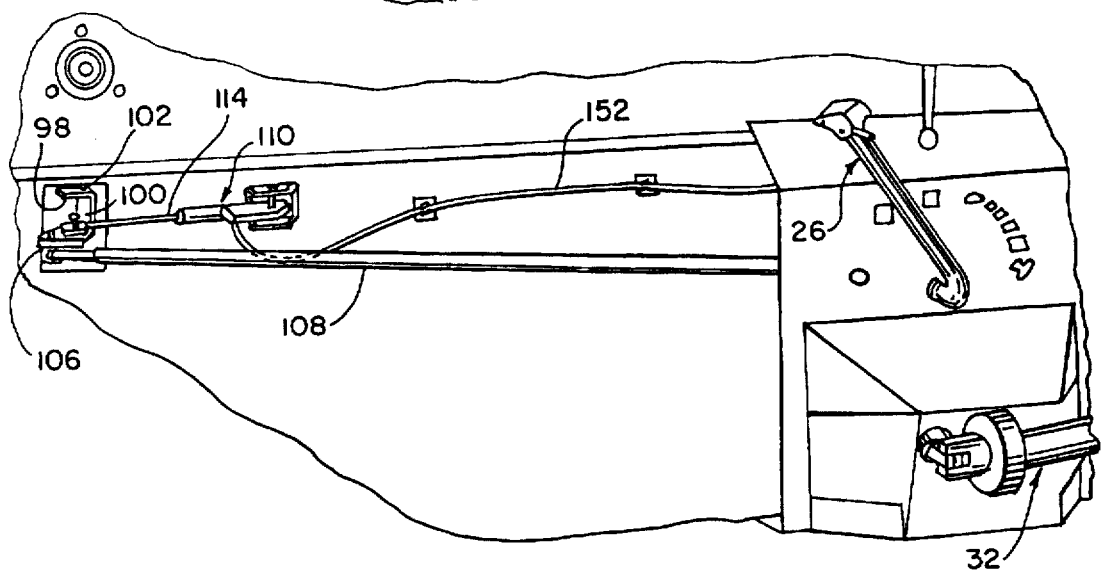
FIG. 2 is a partial isometric view of the forage box of FIG. 1, showing the location of the drive system control arrangement on the forage box.
Figure 3:
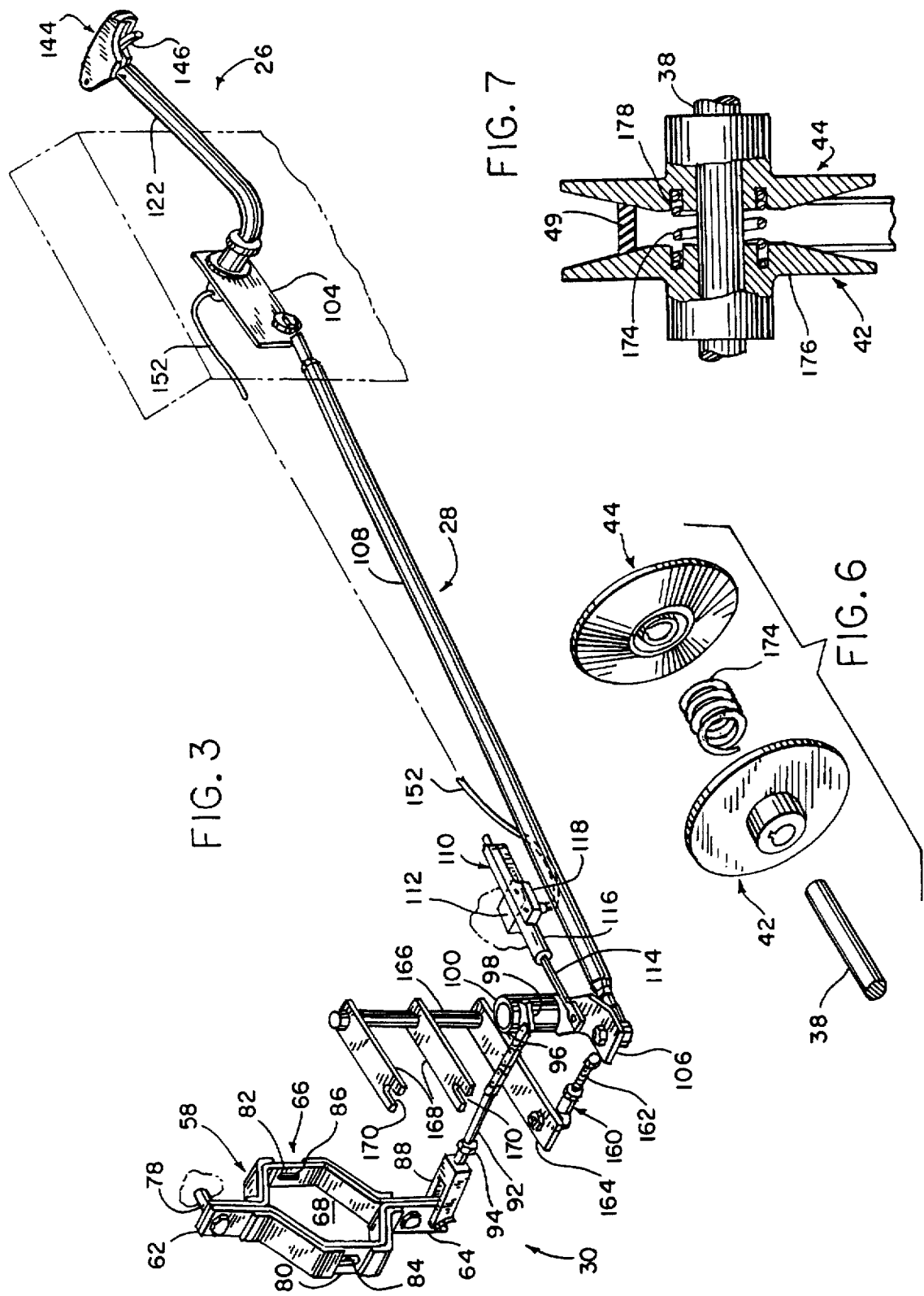
FIG. 3 is an isometric view of the components of the drive system control arrangement of the present invention.

FIGS. 1–7 illustrate the improved variable speed drive system of the invention. Referring to FIGS. 2 and 3, the variable speed drive system includes a control lever assembly 26, an actuator and linkage mechanism 28, and a sheave positioning mechanism 30. These components cooperate to control the speed of operation of the floor conveyor of forage box 10.

Figure 5:
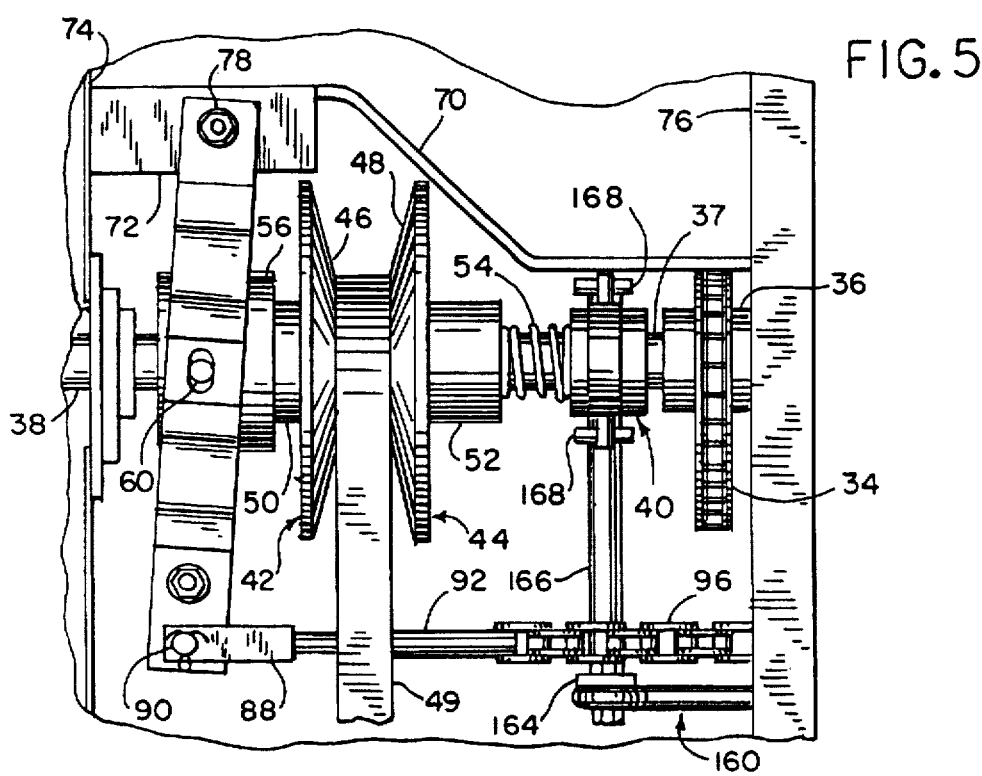
FIG. 5 is an elevation view of the drive components for the forage box of FIG. 1 and interconnection of the drive system and control arrangement of FIG. 3 therewith.

Input power is provided to forage box 10 through a PTO input shaft 32 (FIGS. 1, 2). In a manner as is known, input power from shaft 32 is interconnected directly through a series of chains and sprockets to drive the cross conveyor. Referring to FIG. 5, one of the cross conveyor sprockets drives a chain 34, which in turn drives an input sprocket 36 for the beater assembly drive system. Sprocket 36 imparts rotation to a sprocket input shaft 37, which is selectively engageable with a beater drive input shaft 38 through a clutch assembly 40. Beater drive input shaft 38 provides input power to a conventional beater drive gearbox (not shown). Beater drive clutch assembly 40 provides selective disengagement of beater drive input shaft 38 with sprocket input shaft 37, again in a conventional manner. Movement of clutch assembly 40 between its engaged and disengaged positions will later be explained.

A pair of sheave sections 42, 44 are mounted to sprocket input shaft 37 so as to be rotatable therewith. Sheave section 44 is fixed in position on shaft 37, while sheave section 42 is mounted to shaft 37 for axial movement toward and away from sheave section 44. Sheave sections 42, 44 define facing, angled drive surfaces 46, 48, respectively, with which a drive belt 49 is engaged, and central hub portions 50, 52, respectively, which include passages through which sprocket input shaft 37 extend. A spring 54 bears between the end of hub portion 52 and clutch assembly 40, for urging clutch assembly 40 toward sprocket 36.

Referring to FIGS. 3 and 5, sheave positioning mechanism 30 includes a collar 56 and a yoke assembly 58. Collar 56 includes a central passage through which sprocket input shaft 37 extends, and a pair of opposed, laterally extending tabs 60. Yoke assembly 58 is constructed of a pair of mirror-image U-shaped sections secured together such as by welding or bolting, and defines an upper section 62, a lower section 64 and a central section 66 therebetween defining an opening 68. A mounting bracket 70 having a vertical plate 72 is interconnected between vertical supports 74, 76 of forage box 10, and yoke upper section 62 is pivotably mounted to plate 72 via a bolt 78 extending through an opening formed in upper section 62. Collar 56 is received within yoke opening 68, and side walls 80, 82 of yoke central section 66 are provided with slots 84, 86, respectively, which receive collar tabs 60. A bracket 88 is pivotably mounted to yoke lower section 64 via a pin 90, and a rod 92 having a conventional length adjustment nut 94 extends laterally from the forward end of bracket 88. A length of chain 96 is mounted to the forward end of rod 92, and is connected at its forward end to a mounting lug 98 secured to the outer wall of a pivot tube loo. Pivot tube 100 is mounted for pivoting movement about a vertical pivot axis through a shaft or pin 102 (FIG. 2) extending through a vertical passage defined by pivot tube 100. In this manner, pivot tube 100 is pivotably mounted to forage box 10 about a vertical pivot axis defined by shaft or pin 102.

Actuator and linkage mechanism 28 includes a first actuator plate 104, a second actuator plate 106, and a linkage 108 extending between and pivotably interconnected with each of actuator plates 104, 106. Actuator plate 106 is fixed at its inner end to pivot tube 100, such that actuator plate and pivot tube 100 make up an actuator assembly for controlling movement of sheave positioning mechanism 30 in a manner to be explained.

Figure 4:
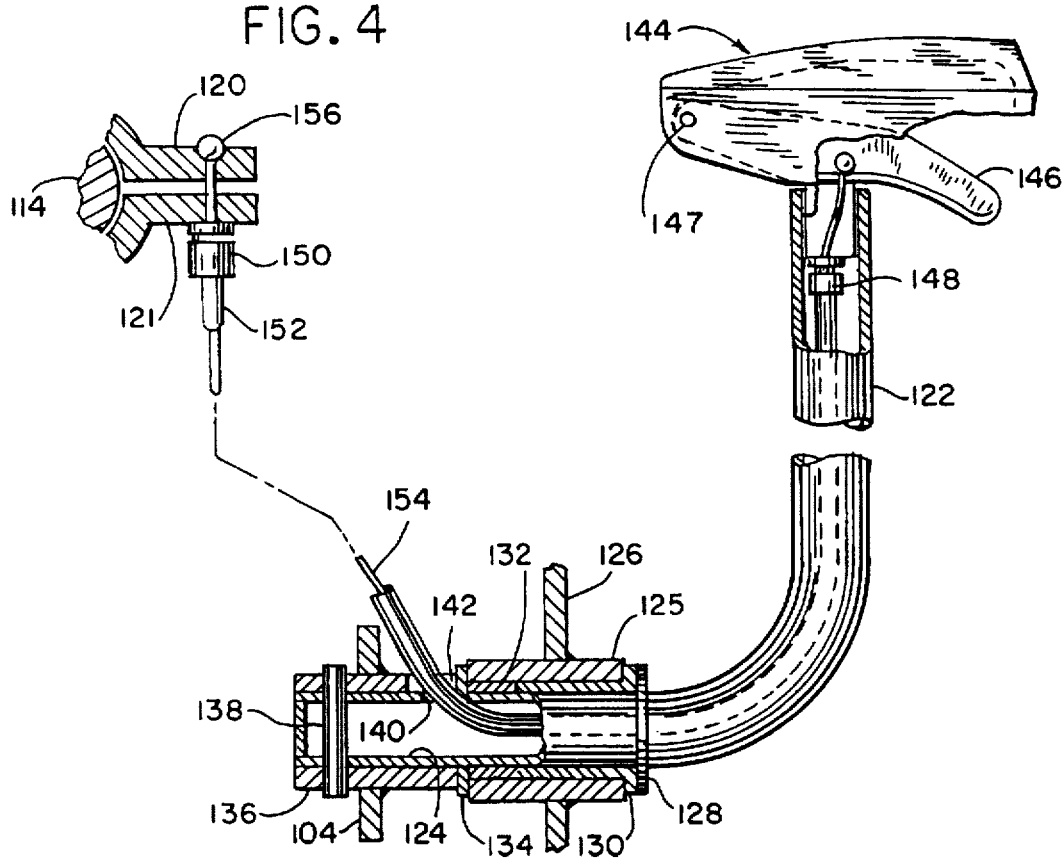
FIG. 4 is an elevation view, with portions in section, showing the control lever of the drive system control arrangement of FIG. 3.

A locking mechanism 110 is fixed to the front of forage box 10 via a mounting block 112. Locking mechanism 110 includes an extendible and retractable locking rod 114 pivotably mounted at its end to actuator plate 106 and a cylindrical body 116 to which block 112 is secured. Locking mechanism 110 further includes an internal clamping mechanism, the enclosure for which is shown at 118 in FIG. 3. Referring to FIG. 4, the clamping mechanism includes a pair of clamping members 120, 121 which are normally biased so as to clamp onto rod 114 and prevent its movement relative to body 116. Representatively, locking mechanism 112 may be as manufactured by P. L. Porter of Woodland Hills, Calif. under its Part No. MM65-2000.

Referring to FIGS. 3 and 4, control lever assembly 26 is in the form of an L-shaped hollow tubular member having an outer leg 122 and an inner leg 124. Inner leg 124 is pivotably mounted to partial front wall 22, which includes a sleeve 125 secured to a front panel 126. A washer 128 is fixed to the outer wall of inner leg 122, and a bushing 130 abuts washer 128 and extends partially through sleeve 125. A bushing 132 extends into the inner end of sleeve 125 over inner leg 124, and a washer 134 abuts the inner end of sleeve 125 to maintain bushing 132 in place. Actuator plate 104 is fixed to a cylindrical hub 136 which fits over the end of inner leg 124 and abuts washer 134, and a pin 138 extends through aligned openings in hub 136 and inner leg 124 to fix hub 136 and actuator plate 104 for rotation along with inner leg 124.

Aligned slots or openings 140, 142 are formed in inner leg 124 and hub 136, respectively, providing communication between the internal passage of inner leg 124 and the exterior of the control lever.

A handle 144 is secured to the end of control lever outer leg 122. Handle 144 includes a trigger 146 which is pivotably mounted to handle 144 via a pivot pin 147. A conventional jacketed cable assembly extends between trigger 146 and the clamping mechanism which includes clamping members 120, 121. In a manner as is known, the jacketed cable assembly includes an end block 148 fixedly secured within the end of control lever outer leg 122, and an end block 150 mounted adjacent one of the clamping members, such as clamping member 121. The jacket between end blocks 148, 150, shown at 152, is of a semi-rigid, noncompressible construction, and a cable 154 extends through jacket 152. One end of cable 154 is fixed to trigger 146, and the other end of cable 154 extends through aligned openings in clamping members 120, 121 and includes an enlarged end portion 156 engageable with clamping member 120. Jacket 152 and cable 154 extend through the internal passage defined by control lever outer leg 122 and inner leg 124, with slots or openings 140, 142 accommodating passage of the jacketed cable externally of inner leg 124 inwardly of panel 126. With this construction, pivoting movement of trigger 146 about its pivot pin 147 introduces tension to cable 154 to move clamping members 120, 121 apart. Upon releasing trigger 146, the biasing force exerted on clamping members 120, 121 moves clamping members 120, 121 back together toward their clamping position, to return trigger 146 to its position as shown in FIG. 4.

In operation, the drive mechanism as shown and described functions as follows. When the user desires to begin unloading forage box 10, the user grasps handle 144 and depresses trigger 146 to move clamping members 120, 121 apart. The user then exerts a clockwise pivoting motion on control lever outer leg 122, which results in clockwise pivoting movement of actuator plate 104. This results in pivoting movement of second actuator plate 106 about the vertical pivot axis defined by pivot tube 100, through shift linkage 108, and extension of locking rod 114. When control lever 26 is in its full-counterclockwise neutral position, the rearwardly facing edge of actuator plate 106 engages a rod 160 having an adjustable bolt 162 defining its end. Rod 160 is in turn pivotably mounted to a bar 164 secured to the lower end of a pivot rod 166, which in turn has a pair of spaced clutch-actuating plates 168 secured thereto. Clutch-actuating plates 168 each include a slot 170 in its end, which receive vertical pins extending from clutch assembly 40. With this arrangement, clutch 40 is moved rearwardly (or leftwardly with respect to FIG. 5) to disengage beater drive input shaft 38 from sprocket input shaft 37, against the force of spring 54 when lever 26 is in its neutral position. This disengages the drive system for beater bars 26 from the cross conveyor of forage box 10. When control lever 26 is in this neutral position, sheave sections 42, 44 are spaced as shown in FIG. 5, in which drive belt 49 is positioned toward the inner portions of drive surfaces 46, 48, but are not driven. To commence operation, the operator pivots control lever 26 clockwise away from its neutral position, which results in engagement of clutch 40 under the force of spring 54 to couple sprocket 36 and its input shaft 37 with beater drive input shaft 38. With belt 49 positioned inwardly on sheave drive surfaces 46, 48, sheave sections 42, 44 provide relatively slow movement of belt 49, which in turn is transferred to an input sheave for the floor conveyor of forage box 10. As the operator continues to move control lever assembly 26 clockwise, pivot tube 100 is pivoted clockwise through second actuator plate 106 and linkage 108, which in turn draws lower section 64 of yoke assembly 66 forward through bracket 88, rod 92 and chain 96. The flexibility of chain 96 enables chain 96 to be wrapped around control tube 100 as it is pivoted in this manner. This in turn results in counterclockwise pivoting movement of yoke assembly 66 about its pivot bolt 78, to force sheave section 42 toward sheave section 44. This results in drive belt 49 climbing outwardly on drive surfaces 46, 48, which in turn increases the speed imparted to drive belt 49 through sheave sections 42, 44.

Referring to FIGS. 6 and 7, a spring 174 is interposed between sheave sections 46, 48. Spring 174 defines a pair of ends, and the facing surfaces of sheave sections 42, 44 and their hub portions 50, 52, respectively define annular recesses 176, 178, respectively, within which the ends of spring are received. When control lever assembly 26 is in its full-counterclockwise position, the facing surfaces of hub portions 50 and 52 engage each other, and belt 49 is at its outwardmost position on drive surfaces 46, 48 to provide top speed for belt 49. Recesses 176, 178 are provided with a depth sufficient to prevent spring 174 from fully compressing when the facing surfaces of hub portions 50, 52 are engaged with each other, to prevent unwanted stresses on the spring. As the operator moves control lever assembly 26 counterclockwise to slow operation of the floor conveyor, second actuator plate 106 and pivot tube 108 are likewise moved counterclockwise. This relieves tension on chain 96, and spring 174 thus forces sheave sections 42, 44 apart. This results in drive belt 49 riding back down drive surfaces 46, 48, to slow its speed of operation and thus the amount of input power to the floor conveyor drive system.

At any position of control lever assembly 26, the operator can release trigger 146 to actuate clamping members 120, 121. This prevents further extension or retraction of locking rod 114, which prevents movement of second actuator plate 106 and thus prevents any movement of pivot tube 100. When this occurs, the position of yoke assembly 66 is fixed, which results in fixing the position of movable sheave section 42. This enables the operator to select virtually any desired speed of operation of the floor conveyor, when control lever 26 is positioned between its neutral position and its full-clockwise top speed position. This constitutes a significant advance over the prior art, which provided fixed, selectable detent positions for controlling the position of the sheave sections. In contrast, the drive system of the present invention enables the operator to position the sheave sections at any desired position relative to each other.

Figure 8:
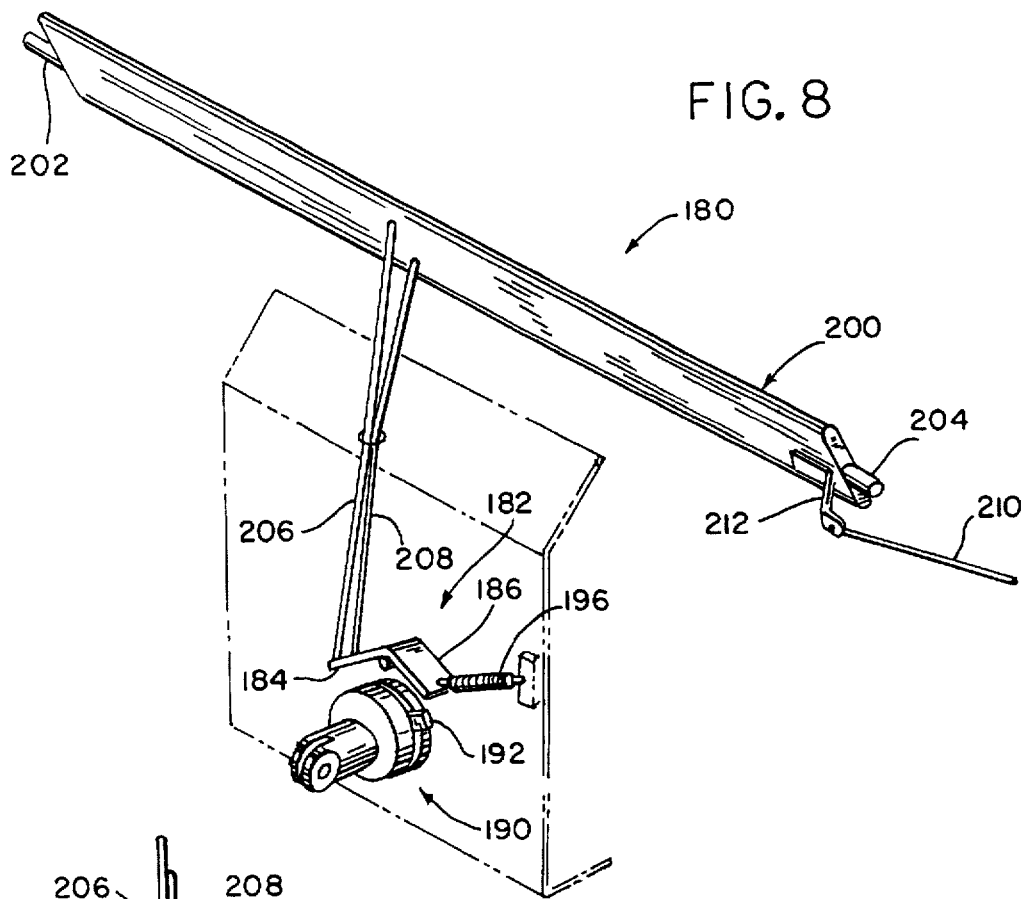
FIG. 8 is an isometric view of the trip mechanism of the present invention as incorporated into the forage box of FIG. 1.
Figure 9:
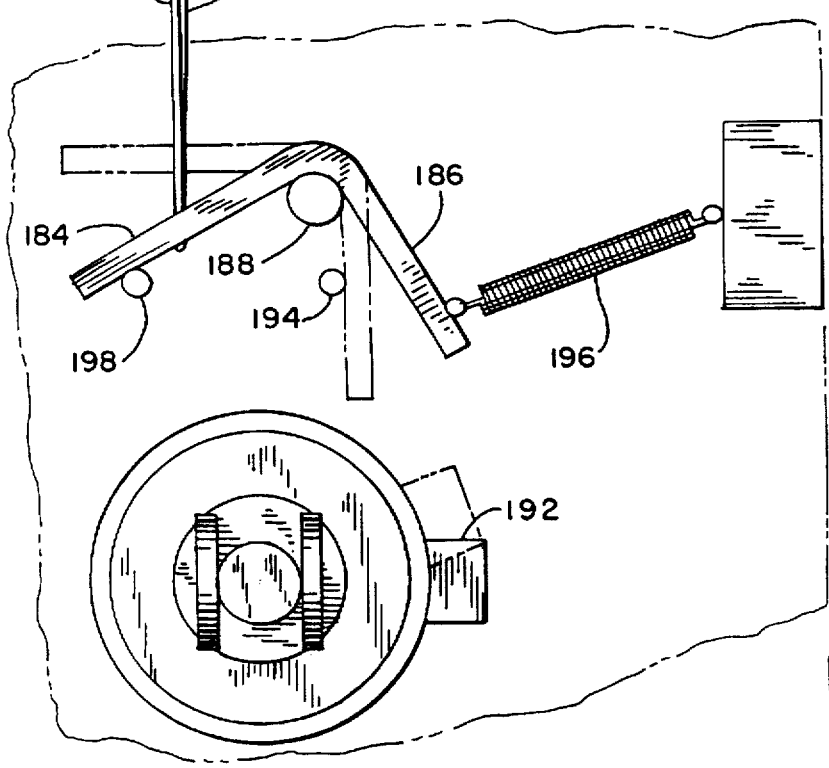
FIG. 9 is a partial elevation view showing operation of the trip mechanism of FIG. 8.

In accordance with another aspect of the invention, a dual action trip assembly 180 is illustrated in FIGS. 8 and 9. Trip assembly 180 includes a conventional trip lever 182 defining angled legs 184, 186 and a pivot pin 188 for mounting lever 182 to an internal front wall of forage box 10. A conventional drive hub 190 is interconnected in the PTO input shaft drive train, and includes a declutch/reset tab 192. The construction of hub 190 is well known, and tab 192 is interconnected with a clutch plate which normally turns with the input shaft power train when power is transferred from the PTO input shaft 32 to the drive system for the unloading components of forage box 10. Referring to FIG. 9, lever leg 186 can be moved to an operative position, shown in phantom, in which its end engages tab 192 to prevent rotation of tab 192 and its associated clutch plate, to declutch the drive system and prevent transfer of power to the unloading components of forage box 10. A stop 194 is provided for maintaining leg 186 in its operative position. A spring 196 is engaged with leg 186 and a mounting block associated with forage box 10, for biasing lever 182 toward its inoperative position as shown in solid lines in FIG. 9. In this position, a stop 198 engages leg 184 to maintain lever 182 in position.

In accordance with the invention, a dual action trip bar 200 is mounted to forage box 10. Trip bar 200 extends across substantially the entire length of the front portion of forage box 10, in the vicinity of the operator when the operator is manipulating control lever assembly 26. Trip bar 200 includes a pair of coaxial mounting stubs 202, 204, which extend along the longitudinal axis of trip bar 200 and are received within mounting structure associated with forage box 10. With this arrangement, trip bar 200 is mounted to forage box 10 for pivoting movement about its longitudinal axis.

An actuator arrangement is interconnected between trip lever 182 and trip bar 200. The actuator arrangement is in the form of a pair of cables 206, 208, which extend into the interior of a housing within which lever 182 and hub 190 are located. Cables 206, 208 are connected at their lower ends to trip lever leg 184. At their upper ends, cables 206, 208 are connected one on either side of the longitudinal axis of trip bar 200. Cables 206, 208 have a length such that, when trip bar 200 is in a neutral position, each cable is pretensioned so as not to have any slack but yet so as to allow trip lever 182 to remain in its inoperative, solid line position of FIG. 9. In the event the operator wishes to disengage the unloading components to forage box 10, the operator grasps trip bar 200 and pivots it in either direction about its longitudinal axis. Grasping the forward edge of trip bar 200 and pulling it downwardly, or grasping the rearward edge of trip bar 200 and pushing it upwardly, will introduce slack into cable 206 and tension into cable 208, such that tensioned cable 208 overcomes the biasing force of spring 196 to move trip lever 182 to its operative position to engage clutch tab 172 and to cease operation of the unloading components of forage box 10. Similarly, grasping the forward edge of trip bar 200 and pushing it upwardly, or grasping the rearward edge of trip bar 200 and pulling it downwardly, results in introduction of tension into cable 206 to likewise move trip lever 182 to its operative position. When the operator wishes to resume operation, the operator releases manual engagement of trip bar 200 and the tension of spring 196 functions to return trip lever 182 to its neutral position and to thus return trip bar 200 to its neutral position.

An auxiliary trip cable 210 is connected to trip bar 200 through a bracket 212, which is mounted to trip bar 200 at a location offset from its longitudinal axis and also offset from the lower surface of trip bar 200. Auxiliary cable 210 extends sidewardly and rearwardly relative to forage box 10, adjacent the location of discharge chute 24. Cable 210 can be pulled by the operator at any time to pivot trip bar 2000 and to thereby move trip lever 182 to its operative position and to stop operation of the box-unloading components of forage box 10.

Various alternatives and embodiments are contemplated as being within the scope of the following claims particularly pointing out and distinctly claiming the subject matter regarded as the invention.

We claim:

1. A control system for an agricultural forage box having a box-unloading mechanism driven in response to a drive arrangement, comprising:

an engagement mechanism movable between an engaged position in which the drive arrangement is engaged and a disengaged position in which the drive arrangement is disengaged;

a variable position mechanism forming a part of the drive arrangement for varying the speed of operation of the box-unloading mechanism;

a single control lever interconnected with the engagement mechanism and the variable position mechanism and movably mounted to the forage box for movement from a neutral position to a range of operative positions between a first operative position and a second operative position, wherein movement of the control lever to its first operative position places the engagement mechanism in its engaged position and moves the variable position mechanism to a first operating position to operate the drive arrangement and the box-unloading mechanism at a first speed, and to its second operative position maintains the engagement mechanism in its engaged position and moves the variable position mechanism to a second operating position to operate the drive arrangement and the box-unloading mechanism at a second speed, and wherein movement of the control lever to its neutral position places the engagement mechanism in its disengaged position; and a control assembly interposed between the control lever and the variable position mechanism, wherein the control assembly provides infinite adjustment of the variable position mechanism between its first and second operating positions to control the speed of operation of the box-unloading mechanism, in response to movement of the control lever between its first and second operative positions.

2. The control system of claim 1, wherein the drive mechanism includes a belt drivingly engaged with a pair of sheaves, and wherein the variable position mechanism comprises one of the sheaves being split into a pair of sections defining spaced, angled drive surfaces, wherein at least one of the sheave sections is movable so as to vary the spacing between the drive surfaces to vary the position of the belt on the sheave sections.

3. The control system of claim 2, wherein the sheave sections are movable into engagement with each other, and further comprising a spring interposed between the sheave sections for urging the sheave sections apart, and mounting structure for mounting the spring to the sheave sections, the mounting structure being arranged and dimensioned so as to prevent the spring from attaining a fully compressed condition when the sheave sections are moved into engagement with each other.

4. The control system of claim 2, wherein the control assembly comprises:

a first actuator member interconnected with the control lever and movable in response to movement of the control lever;

a second actuator member;

a shift linkage interconnected between the first and second actuator members for moving the second actuator member in response to movement of the control lever and the first actuator member;

a movable sheave positioning mechanism interconnected between the second actuator member and one of the sheave sections for controlling the position of at least one of the sheave sections; and a selectively actuable locking mechanism interconnected with one of the actuator members for maintaining the control assembly in a selected position.

5. A control system for an agricultural forage box having a box-unloading mechanism driven in response to a drive arrangement including a belt drivingly engaged with a pair of sheaves, comprising:

a variable position mechanism forming a part of the drive arrangement for varying the speed of operation of the box-unloading mechanism, the variable position mechanism comprising one of the sheaves being split into a pair of sections defining spaced, angled drive surfaces, wherein at least one of the sheave sections is movable so as to vary the spacing between the drive surfaces to vary the position of the belt on the sheave sections;

a control lever interconnected with the variable position mechanism and movably mounted to the forage box for movement from a neutral position to a range of operative positions between a first operative position and a second operative position, wherein movement of the control lever to its first operative position moves the variable position mechanism to a first operating position to operate the drive arrangement and the box-unloading mechanism at a first speed, and to its second operative position moves the variable position mechanism to a second operating position to operate the drive arrangement and the box-unloading mechanism at a second speed and wherein the control lever is pivotably mounted to the forage box for movement about a first pivot axis; and a control assembly interposed between the control lever and the variable position mechanism, wherein the control assembly provides infinite adjustment of the variable position mechanism between its first and second operating positions to control the speed of operation of the box-unloading mechanism, in response to movement of the control lever between its first and second operative positions, the control assembly comprising:

a first actuator member interconnected with the control lever so as to be pivotable therewith about the first pivot axis and movable in response to movement of the control lever;

a second actuator member;

a shift linkage interconnected between the first and second actuator members for moving the second actuator member in response to movement of the control lever and the first actuator member;

a movable sheave positioning mechanism interconnected between the second actuator member and one of the sheave sections for controlling the position of at least one of the sheave sections; and a selectively actuable locking mechanism interconnected with one of the actuator members for maintaining the control assembly in a selected position.

6. The control system of claim 5, wherein the first actuator member comprises an actuator plate, and wherein the shift linkage is pivotably interconnected with the actuator plate at a location offset from the first pivot axis so as to be pivotable about a second pivot axis substantially parallel to the first pivot axis.

7. The control system of claim 5, wherein the locking mechanism includes a manually operable lock release associated with the control lever for manipulation by a user to selectively enable movement of the control lever to move the sheave positioning mechanism through the shift linkage and the first and second actuator members.

8. The control system of claim 7, wherein the control lever includes a handle, and wherein the manually operable lock release is movably mounted adjacent the handle.

9. A control system for an agricultural forage box having a box-unloading mechanism driven in response to a drive arrangement including a belt drivingly engaged with a pair of sheaves, comprising:

a variable position mechanism forming a part of the drive arrangement for varying the speed of operation of the box-unloading mechanism, the variable position mechanism comprising one of the sheaves being split into a pair of sections defining spaced, angled drive surfaces, wherein at least one of the sheave sections is movable so as to vary the spacing between the drive surfaces to vary the position of the belt on the sheave sections;

a control lever interconnected with the variable position mechanism and movably mounted to the forage box for movement from a neutral position to a range of operative positions between a first operative position and a second operative position, wherein movement of the control lever to its first operative position moves the variable position mechanism to a first operating position to operate the drive arrangement and the box-unloading mechanism at a first speed, and to its second operative position moves the variable position mechanism to a second operating position to operate the drive arrangement and the box-unloading mechanism at a second speed; and a control assembly interposed between the control lever and the variable position mechanism, wherein the control assembly provides infinite adjustment of the variable position mechanism between its first and second operating positions to control the speed of operation of the box-unloading mechanism, in response to movement of the control lever between its first and second operative positions, the control assembly comprising:

a first actuator member interconnected with the control lever and movable in response to movement of the control lever;

a second actuator member;

a shift linkage interconnected between the first and second actuator members for moving the second actuator member in response to movement of the control lever and the first actuator member;

a movable sheave positioning mechanism interconnected between the second actuator member and one of the sheave sections for controlling the position of at least one of the sheave sections; and a selectively actuable locking mechanism interconnected with one of the actuator members for maintaining the control assembly in a selected position, wherein the locking mechanism includes a manually operable lock release associated with the control lever for manipulation by a user to selectively enable movement of the control lever to move the sheave positioning mechanism through the shift linkage and the first and second actuator members, and including a clamp assembly and a tension cable interconnected with the clamp assembly for moving the clamp assembly away from a clamping position, wherein the lock release is operable on the tension cable to relieve the clamping force exerted by the clamp assembly.

10. The control system of claim 9, wherein the control lever includes an internal passage, and wherein at least a portion of the tension cable is disposed within the internal passage.

11. A control system for an agricultural forage box having a box-unloading mechanism driven in response to a drive arrangement including a belt drivingly engaged with a pair of sheaves, comprising:

a variable position mechanism forming a part of the drive arrangement for varying the speed of operation of the box-unloading mechanism, the variable position mechanism comprising one of the sheaves being split into a pair of sections defining spaced, angled drive surfaces, wherein at least one of the sheave sections is movable so as to vary the spacing between the drive surfaces to vary the position of the belt on the sheave sections;

a control lever interconnected with the variable position mechanism and movably mounted to the forage box for movement from a neutral position to a range of operative positions between a first operative position and a second operative position, wherein movement of the control lever to its first operative position moves the variable position mechanism to a first operating position to operate the drive arrangement and the box-unloading mechanism at a first speed, and to its second operative position moves the variable position mechanism to a second operating position to operate the drive arrangement and the box-unloading mechanism at a second speed; and a control assembly interposed between the control lever and the variable position mechanism, wherein the control assembly provides infinite adjustment of the variable position mechanism between its first and second operating positions to control the speed of operation of the box-unloading mechanism, in response to movement of the control lever between its first and second operative positions, the control assembly comprising:

a first actuator member interconnected with the control lever and movable in response to movement of the control lever;

a second actuator member pivotably mounted to the forage box for controlling the position of the movable sheave positioning mechanisms;

a shift linkage interconnected between the first and second actuator members for moving the second actuator member in response to movement of the control lever and the first actuator member;

a movable sheave positioning mechanism interconnected between the second actuator member and one of the sheave sections for controlling the position of at least one of the sheave sections; and a selectively actuable locking mechanism interconnected with one of the actuator members for maintaining the control assembly in a selected position, and wherein the selectively actuable locking mechanism is interconnected between the second actuator member and the forage box for selectively preventing movement of the second actuator member.

12. A control system for an agricultural forage box having a box-unloading mechanism driven in response to a drive arrangement including a belt drivingly engaged with a pair of sheaves, comprising:

a variable position mechanism forming a part of the drive arrangement for varying the speed of operation of the box-unloading mechanism, the variable position mechanism comprising one of the sheaves being split into a pair of sections defining spaced, angled drive surfaces, wherein at least one of the sheave sections is movable so as to vary the spacing between the drive surfaces to vary the position of the belt on the sheave sections;

a control lever interconnected with the variable position mechanism and movably mounted to the forage box for movement from a neutral position to a range of operative positions between a first operative position and a second operative position, wherein movement of the control lever to its first operative position moves the variable position mechanism to a first operating position to operate the drive arrangement and the box-unloading mechanism at a first speed, and to its second operative position moves the variable position mechanism to a second operating position to operate the drive arrangement and the box-unloading mechanism at a second speed; and a control assembly interposed between the control lever and the variable position mechanism, wherein the control assembly provides infinite adjustment of the variable position mechanism between its first and second operating positions to control the speed of operation of the box-unloading mechanism, in response to movement of the control lever between its first and second operative positions, the control assembly comprising:

a first actuator member interconnected with the control lever and movable in response to movement of the control lever;

a second actuator member including a pivotable section which is pivotable in response to movement of the second actuator member;

a shift linkage interconnected between the first and second actuator members for moving the second actuator member in response to movement of the control lever and the first actuator member;

a movable sheave positioning mechanism interconnected between the second actuator member and one of the sheave sections for controlling the position of at least one of the sheave sections, the sheave positioning mechanism including a pivotable yoke member to which one of the sheave sections is mounted, and a connector including a flexible section interposed between the pivotable section of the second actuator member and the yoke member to provide pivoting movement of the yoke member in response to pivoting movement of the pivotable section of the second actuator member; and a selectively actuable locking mechanism interconnected with one of the actuator members for maintaining the control assembly in a selected position.

13. The control system of claim 12, wherein the connector flexible section comprises a length of chain secured at one end to the pivotable section of the second actuator member.

14. The control system of claim 12, wherein the yoke is mounted for pivoting movement about a yoke pivot axis oriented transverse to the axis about which the sheave sections are rotatable, and wherein the connector is secured to the yoke for pivoting movement about a pivot axis parallel to the yoke pivot axis.

15. The control system of claim 12, further comprising a spring interposed between the pair of sheave sections for biasing the sheave sections apart, and wherein movement of the connector in a first direction introduces tension into the connector flexible section and causes movement of the yoke and the movable sheave section in a direction toward the other sheave section against the biasing force of the spring to move the sheave sections together, and wherein movement of the control lever so as to introduce slack in the connector flexible section results in movement of the sheave sections apart under the force of the spring.

16. The control system of claim 15, wherein the sheave sections include annular recesses for receiving the ends of the spring, and wherein the sheave sections and recesses are configured and dimensioned such that facing surfaces of the sheave sections engage each other when the sheave sections are moved fully together to prevent the spring from attaining a fully compressed condition.

17. A control system for an agricultural forage box having a box-unloading mechanism driven in response to a drive arrangement and having a beater mechanism driven in response to a beater drive arrangement, comprising:

a variable position mechanism forming a part of the drive arrangement for varying the speed of operation of the box-unloading mechanism;

a control lever interconnected with the variable position mechanism and movably mounted to the forage box for movement from a neutral position to a range of operative positions between a first operative position, a second operative position and a third operative position, wherein movement of the control lever to its first operative position engages the beater drive arrangement only, and to its second operative position maintains engagement of the beater drive arrangement and moves the variable position mechanism to a first operating position to operate the drive arrangement for the box-unloading mechanism at a first speed, and to its third operative position maintains engagement of the beater drive arrangement and moves the variable position mechanism to a second operating position to operate the drive arrangement and the box-unloading mechanism at a second speed; and a control assembly interposed between the control lever and the variable position mechanism, wherein the control assembly provides infinite adjustment of the variable position mechanism between its first and second operating positions to control the speed of operation of the box-unloading mechanism, in response to movement of the control lever between its second and third operative positions.

* * * * *